United States Patent

Suzuki

Patent Number: 5,618,477
Date of Patent: Apr. 8, 1997

[54] METHOD AND DIE APPARATUS FOR PRODUCING PLASTIC MOLDING HAVING FOAM WITH SKIN

[75] Inventor: Hiroshi Suzuki, Anjo, Japan

[73] Assignee: Kabushiki Kaisha Inoac Corporation, Nagoya, Japan

[21] Appl. No.: 337,431

[22] Filed: Nov. 8, 1994

[30] Foreign Application Priority Data

Jun. 10, 1994 [JP] Japan .................................. 6-152586

[51] Int. Cl.$^6$ ............................ B29C 44/06; B29C 44/12
[52] U.S. Cl. ...................... 264/46.5; 264/46.6; 264/276; 264/277
[58] Field of Search ................................ 264/45.2, 46.4, 264/46.5, 46.6, 275, 276, 277; 425/4 R, 817 R; 428/121, 122, 123, 124, 128, 129, 130

[56] References Cited

U.S. PATENT DOCUMENTS

| | | | |
|---|---|---|---|
| 4,793,784 | 12/1988 | Belleville et al. | 425/817 R |
| 5,006,288 | 4/1991 | Rhodes, Jr. et al. | 264/46.4 |
| 5,500,168 | 3/1996 | Suzuki | 264/46.5 |

Primary Examiner—David A. Simmons
Assistant Examiner—Kenneth M. Jones
Attorney, Agent, or Firm—Armstrong, Westerman, Hattori, McLeland & Naughton

[57] ABSTRACT

A method for producing a plastic molding having a core and a foam with a skin on an outer surface of the core wherein a foaming material is foamed in a space defined between a skin member and the core, disposed within a molding die assembly having an upper die and a lower die includes disposing the skin member which is provided with edge portions that are bent backward to define side portions and engaging recesses provided on the side portions or in the vicinity thereof, on the lower die of the molding die assembly that is provided with engaging projections corresponding to the engaging recesses of the skin member, so that the engaging projections of the lower die are fitted in the corresponding engaging recesses of the skin member to position and hold the latter; disposing the core which is provided with side walls which define a foaming material receiving portion on the die surface of the upper surface of the die assembly, so that the skin member is fitted in the foaming material receiving portion; and pouring and foaming the foaming material in a cavity defined by and between the core and the skin member, so that the side portions of the skin member can be pressed against the side walls of the foaming material receiving portion of the core by the foaming pressure generated and increased by foaming (continuing reaction) of the foaming material so as to seal the connection between the core and the skin member thereby to produce a predetermined shape of a plastic molding. The disclosure is also directed to a molding die apparatus for producing such a plastic molding.

5 Claims, 7 Drawing Sheets

METHOD AND DIE APPARATUS FOR PRODUCING PLASTIC MOLDING HAVING FOAM WITH SKIN

BACKGROUND OF THE INVENTION

1. Field of the Invention

The present invention relates to a method for producing a plastic molding including a core which is provided on an outer surface thereof with a foam with a skin, and a molding die apparatus for producing the same. Note that the "outer surface of the core" refers to the surface of the core that is located adjacent to an outer surface of a plastic molding (product) to be obtained.

2. Description of the Related Art

For instance, a conventional instrument panel for an automobile is usually made of a core (or base or substrate) which is provided on the outer surface thereof with a pad comprising a foam with a skin.

In a known method for producing such a plastic molding (product) having on the outer surface thereof a foam with a skin, an outer skin 112 which is provided, on a periphery of a product portion 110 thereof, with a skirt 111 is disposed on a lower die 115 so that the skirt 111 is located on a parting of a die assembly which surrounds a cavity 114 of a die assembly 113 defined by the lower die 115 and an upper die 116, as can be seen in FIG. 14. The core 118 is disposed on the die surface 117 of the upper die 116. When the upper die 116 and the lower die 115 are closed, the skirt 111 is held between and by the upper and lower dies. In this state, a foaming material poured in the cavity between the core 118 and a product portion 110 of the skin is foamed to be integral with the core and the skin. Finally, the skirt 111 is cut at the periphery thereof and removed from the plastic molding thus produced. Note that the lower die 115 in FIG. 14 is provided with split dies 119 which constitute parts thereof, for an ease of removal of the molding (product) from the die assembly. The split dies (parts of lower die) are provided with projections 120 provided on the parting, so that the projections 120 can be fitted in corresponding recesses 121 formed on the outer end 112 extending from the skirt 111.

The skirt 111 is adapted to seal the connection between the upper and lower dies during the foaming operation. The skirt 111 which is unnecessary in a product must be finally cut and removed as mentioned above. Consequently, not only is there a waste of material of which the skin is made, but also a troublesome trimming operation to cut and remove the skirt is necessary in the prior art, as mentioned above.

SUMMARY OF THE INVENTION

It is an object of the present invention to provide a simple method and die apparatus for producing a plastic molding having a foam with a skin, in which there is no or little waste of the skin material and no trimming operation including cutting of the skirt is necessary after the foaming is completed.

To achieve the object mentioned above, according to an aspect of the present invention, there is provided a method for producing a plastic molding having a core and a foam with a skin on an outer surface of the core wherein a foaming material is foamed in a space defined between a skin member and the core, disposed within a molding die assembly having an upper die and a lower die, comprising the steps of disposing the skin member which is provided with edge portions that are bent backward to define side portions and engaging recesses provided on the side portions or in the vicinity thereof, on the lower die of the molding die assembly that is provided with engaging projections corresponding to the engaging recesses of the skin member, so that the engaging projections of the lower die are fitted in the corresponding engaging recesses of the skin member to position and hold the latter; disposing the core which is provided with side walls which define a foaming material receiving portion on the surface of the upper die of the die assembly, so that the skin member is fitted in the foaming material receiving portion; and pouring and foaming the foaming material in a cavity defined by and between the core and the skin member, so that the side portions of the skin member can be pressed against the side walls of the foaming material receiving portion of the core by the foaming pressure, i.e., the internal pressure within the closed space between the core and the skin member, which is generated and increased by foaming (continuing reaction) of the foaming material, so as to seal the connection between the core and the skin member thereby to produce a predetermined shape of a plastic molding.

According to another aspect of the present invention, there is provided a method for producing a plastic molding having a core and a foam with a skin on an outer surface of the core wherein a foaming material is foamed in a space defined between a skin member and the core, disposed within a molding die assembly having an upper die and a lower die, comprising the steps of disposing the skin member which is provided with edge portions that are bent backward into a generally U-shape in cross section to define side portions with flanges projecting inward therefrom and engaging recesses provided on the side portions or in the vicinity thereof, on the lower die of the molding die assembly that is provided with engaging projections corresponding to the engaging recesses of the skin member, so that the engaging projections of the lower die are fitted in the corresponding engaging recesses of the skin member to position and hold the latter; disposing the core within the die assembly, so that the core is brought into contact with the flanges; and pouring and foaming the foaming material in a cavity defined by and between the core and the skin member, so that the flanges of the skin member can be pressed against the core by the foaming pressure so as to seal the connection between the core and the skin member thereby to produce a predetermined shape of a plastic molding.

According to yet another aspect of the present invention, there is provided a die apparatus for producing a plastic molding including a lower die on which a skin member which is provided with side portions formed by bending the edge portions of the skin member backward and engaging recesses provided on the side portions or in the vicinity thereof, and an upper die on which a core is disposed, wherein a foaming material is foamed between the skin member and the core, comprising engaging projections provided on the die surface of the lower die, so that the engaging projections can be disengageably fitted in the corresponding engaging recesses of the skin member.

According to the first aspect of the present invention, the side portions of the skin member which are bent backward are pressed onto the inner surfaces of the side walls of the core that define the foaming material receiving portion by the foaming pressure to establish a reliable seal between the core and the skin member. Consequently, no sealing skirt of the skin member is necessary, thus resulting in no waste of the material of which the skin member is made. Moreover, since the engaging projections of the lower die are fitted in the corresponding engaging recesses provided on the side portions of the skin member or in the vicinity thereof, the skin member can be correctly positioned and firmly held, so that no displacement of the skin member occurs during the introduction of the foaming material or the foaming operation thereof. Namely, no inclination or falling of the side portions of the skin member takes place. Consequently, there is no clearance between the side portions of the skin member and the side walls of the core, due to the falling or inclination of the side portions of the skin member, thus resulting in a fluid-tight seal therebetween.

As may be seen in FIG. 12, the side portions 133 of the skin member 132 that are provided with the engaging recesses 131 are hidden by a part, such as a door of a glove compartment, etc., within the automobile, and accordingly, are invisible from the outside, thus resulting in a good appearance of the plastic molding (product). In FIG. 12, numeral 135 connotes the foam assembly having a foam 136 with a skin 132, and 137 the core, respectively. In the case that the engaging recesses 138 are provided in the vicinity of the side portions of the skin member, the engaging recesses 138 can be hidden by a dark-color portion 120 provided on an edge of a pane of an automobile or the like to improve the aesthetic appearance of the plastic molding (product), as shown in FIG. 13. In FIG. 13, numeral 141 designates the foam assembly having a foam 143 with a skin 142, and 144 the core, respectively.

According to the second aspect of the present invention, the flanges that are formed by bending backward the ends of the skin member into a generally U-shape in cross section are brought into press contact with the side walls of the core by the foaming pressure to establish a fluid-tight seal between the core and the skin member. Consequently, no skirt of the skin member is necessary, similarly to the first invention. The engagement of the engaging projections and the corresponding engaging recesses is identical to that in the first invention.

According to the third aspect of the present invention, in spite of an absence of a sealing skirt extending from a product portion of the skin member, not only can a fluid-tight connection be stably established between the skin member and the core, but also the foaming material can be certainly and easily foamed in the cavity defined by and between the core and the skin member, similarly to the first and second inventions.

BRIEF DESCRIPTION OF THE DRAWINGS

The invention will be described below in detail with reference to the accompanying drawings, in which.

DESCRIPTION OF THE PREFERRED EMBODIMENT

Figure 1:
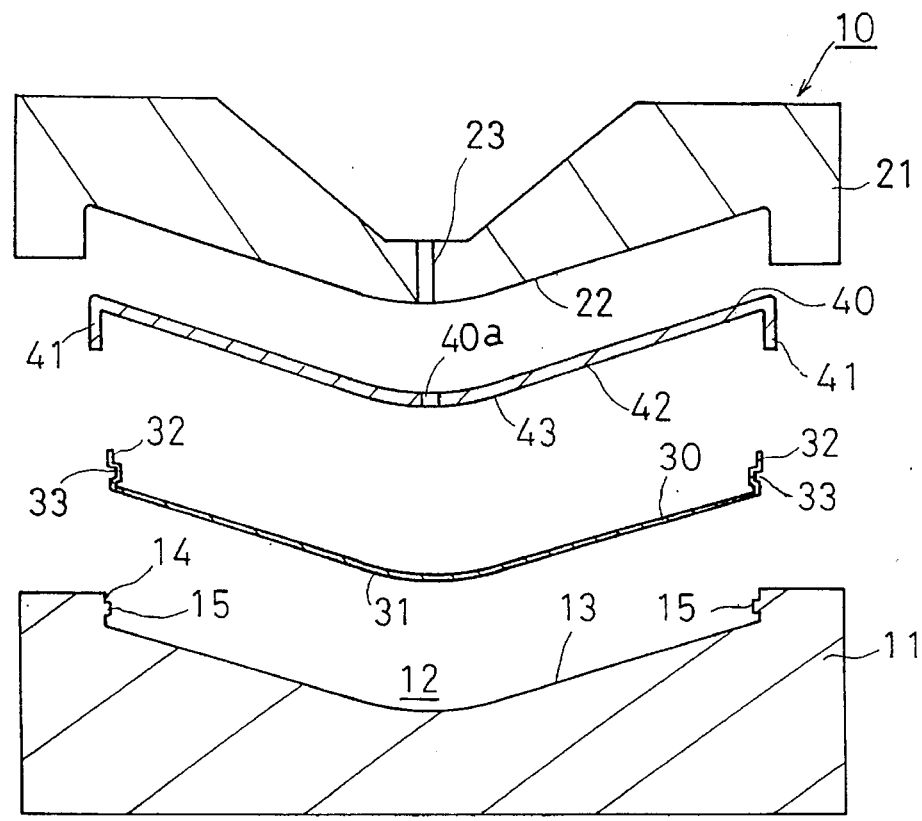
FIG. 1 is a sectional view of a molding die assembly according to the present invention.

An embodiment illustrated in FIG. 1 is applied to a molding die assembly (die apparatus) 10 which can be adapted to produce a plastic molding having a core which is entirely covered by a foam with a skin.

Figure 5:
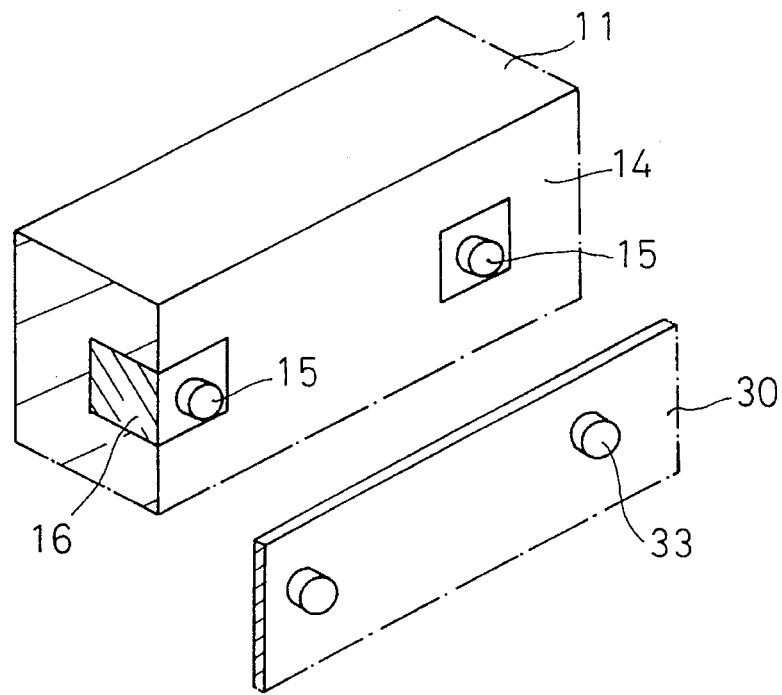
FIG. 5 is a partial perspective view of engaging projections and corresponding engaging recesses, by way of example.
Figure 6:
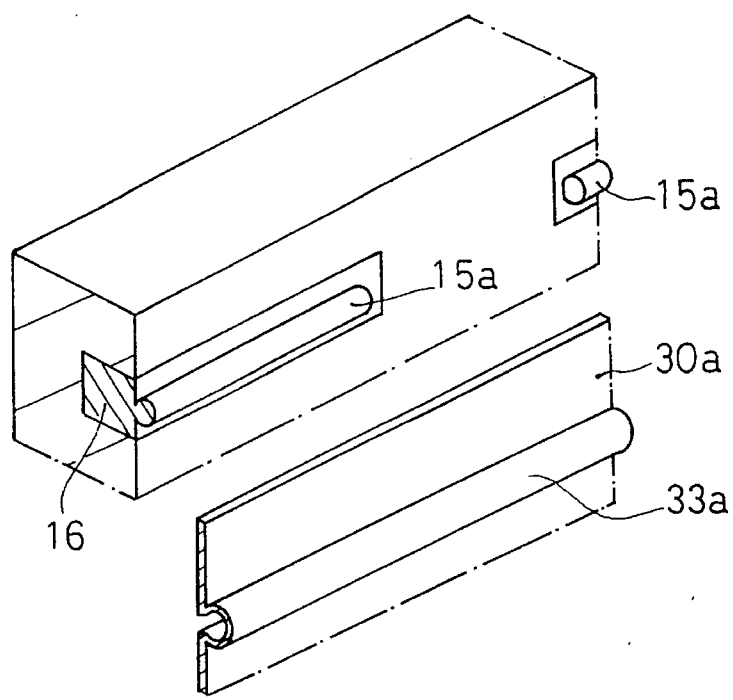
FIG. 6 is a partial perspective view of another embodiment of engaging projections and corresponding engaging recesses.
Figure 7:
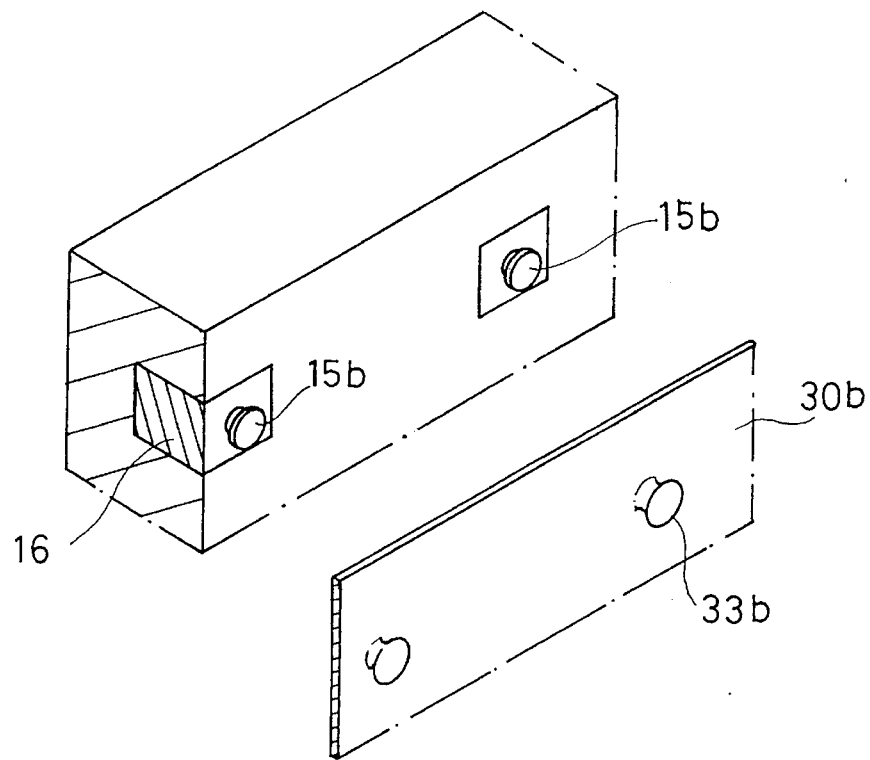
FIG. 7 is a partial perspective view of still another embodiment of engaging projections and corresponding engaging recesses.

The molding die assembly 10 comprises a lower die 11 and an upper die 21. The lower die 11 is provided with a concave die surface 13 which defines a foaming cavity 12. A skin member 30 is disposed on the die surface 13 to produce a plastic molding, as will be discussed hereinafter. Engaging projections 15 are provided on the side wall of the lower die 11 that defines the side surface of the cavity 12. The engaging projections 15 can be fitted in corresponding engaging recesses 33 formed on side wall of the skin member 30 to position and immovably hold the skin member 30 with respect to the lower die The engaging projections 15 are in the form of a short circular post and are spaced at a predetermined distance, as shown in FIG. 5. Alternatively, it is possible to provide spaced engaging projections 15a which are substantially in the form of an axially elongated circular rod, as shown in FIG. 6. In this alternative, the engaging recesses 33a to be formed on the skin member 30a are in the form of an axially elongated groove 33a whose shape corresponds to the shape of the engaging projections 15a, so that the latter can be fitted in the engaging recesses 33a. The engaging projections 15 (or 15a) and the engaging recesses 33 (or 33a) constitute a disengageable fastener. Furthermore, as shown in FIG. 7, it is also possible to provide engaging projections 15b which are in the form of a button with a larger diameter head, so that the engaging projections 15b can be disengageably engaged in the corresponding recesses 33b provided on the skin member 30b in a snap-fashion. This ensures that the skin member 30b is correctly positioned at a predetermined position and firmly connected to the lower die 11. For example, the engaging projections 15 have 5 mm diameter and 2 mm height and are spaced at a distance of 35 mm; the fastener type engaging projections 15a have a diameter of 2 mm and a length of 20 mm, and are spaced at a distance of 40 mm; and, the snap type engaging projections 15b have a diameter of 4 mm at the base portions thereof, a diameter of 5 mm at the larger diameter head and a height of 2 mm, and are spaced at a distance of 50 mm.

The engaging projections 15 (15a, 15b) are each provided with an undercut, so that when the plastic molding is removed from the die assembly, the engaging projections can be easily disengaged from the corresponding engaging recesses 33 (33a, 33b) owing to an elastic deformation of a foam made of a foaming material, thus resulting in an easy separation of the plastic molding from the die assembly.

Although the engaging projections 15 (15a, 15b) which are made of metal are directly provided on the side surface of the cavity 12 in the illustrated embodiments, it is possible to form the engaging projections integral with elastic bodies 16 such as a urethane-elastomer, that are embedded in the lower die 11. Consequently, even the fastener type engaging projections or the snap type engaging projections can be easily disengaged from the corresponding engaging recesses owing to the elastic deformation of the foam as well as the elastic deformation of the engaging projections, even if a close connection between the engaging projections and the engaging recesses is established by the foaming pressure.

The upper die 21 is provided with a die surface 22 on which the core 20 can be disposed. A core holder or core holders, (not shown) per se known is usually provided on the die surface 22. The core holder is constituted, for example, by a hole (or holes) and/or a mounting clip (or clips) that are provided on the die surface 22 and can be disengageably engaged with the corresponding portions provided on the back side of the cores (not shown). The die assembly 10 of the illustrated embodiment is applied to a closed-pouring system in which the foaming material comprising reactive ingredients such as polyurethane composition is poured in the closed molding dies. The upper die 21 is therefore provided with a foaming material pouring port 23 which extends through the upper die from the outside to the inside thereof.

The following discussion will be directed to a method for producing a plastic molding using the die assembly 10 as constructed above.

The skin member 30 is disposed on the die surface 13 of the lower die 11 and the core 40 is disposed on the die surface 22 of the upper die 21.

Figure 2:
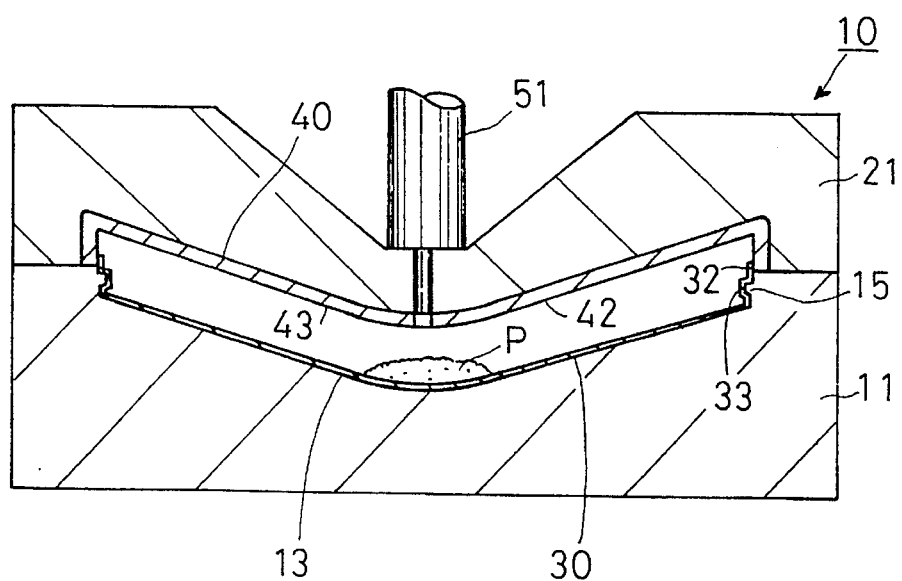
FIG. 2 is a sectional view of a molding die assembly shown in a closed position to produce a plastic molding, according to the present invention.

The skin member 30 to be used is made of an impermeable material, such as a leather-like plastic sheet or a fabric sheet whose back surface is coated with a plastic or banded with a plastic film or foam sheet. The skin member 30 whose front surface 31 constitutes an outer surface of the product is provided with the opposed ends that are bent backward to form side portions 32 of the product. The engaging recesses 33 are formed on the outer surfaces of the side portions 32. It should be appreciated that the skin member 30 has no skirt which has been indispensable in the prior art. The side portions and the engaging recesses of the skin can be molded at the same when the skin is molded in a predetermined shape. The engaging recesses 33 whose shape corresponds to the shape of the engaging projections 15 of the lower die 11 are fitted in the corresponding engaging projections 15 to position and immovably hold the skin member 30 when the skin member 30 is disposed on the die surface 13 of the lower die 11, as can be seen in FIG. 2.

The core 40 is made of a self-shape maintaining plastic material, such as acrylonitrile-butadiene-styrene (ABS) resin, polypropylene, polyphenylene oxide or fiber-reinforced plastic, etc. The core 40 is provided with side walls 21 which are formed by bending the opposed ends thereof toward the outer surface of the plastic molding, i.e., toward the skin member 30. The side walls 41 define a foaming material receiving portion 42, together with the outer surface of the core 40. The foaming material is introduced in the foaming material receiving portion 42 through a through hole 40a formed in the core 40.

The side walls 32 of the skin member 30 and the side walls 41 of the core 40 are shaped and sized such that when the upper and lower dies 21 and 11 are closed, the free ends (upper ends) of the side walls 32 of the skin member 30 extend beyond the upper surface of the lower die 11 and come into contact with the inner surfaces of the side walls 41 of the core 40, at the outer surfaces of the free ends of the side walls 32.

The foaming material P is introduced in the cavity (foaming material receiving portion 43) defined by and between the lower and upper dies 11 and 21 that are closed, through a pouring nozzle 51 of a pouring device (not shown) inserted in the foaming material pouring port 23 of the upper die 21. During the introduction of the foaming material P, no displacement of the skin member 30 (and the core 40) or no falling or inclination of the side walls 32 takes place owing to the engagement between the engaging projections 15 of the lower die 11 and the engaging recesses 33 of the skin member 30.

Figure 3:
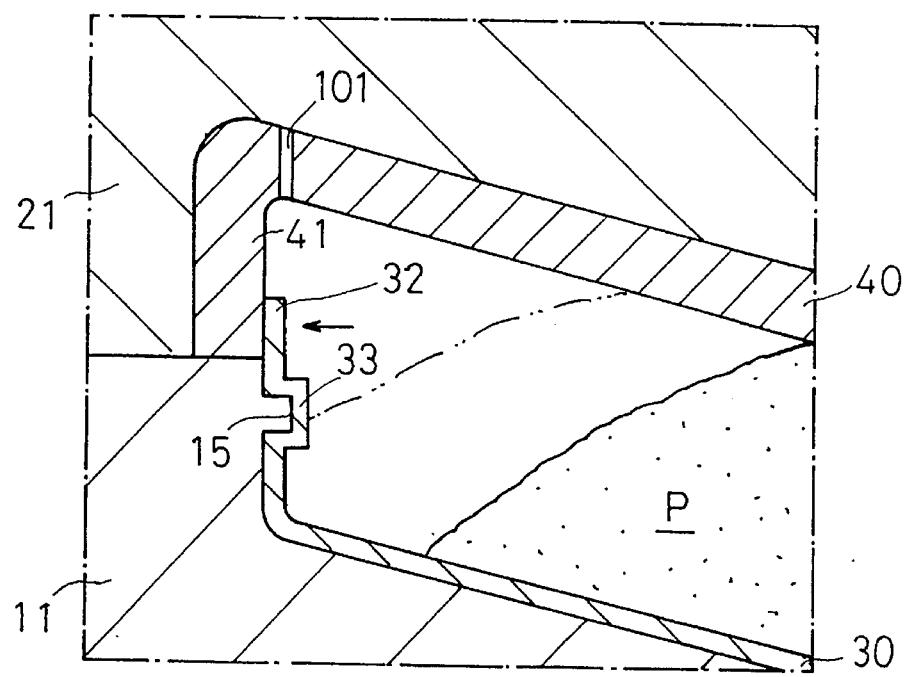
FIG. 3 is an enlarged sectional view of a main part of FIG. 2 to explain the operation of the molding die assembly.
Figure 4:
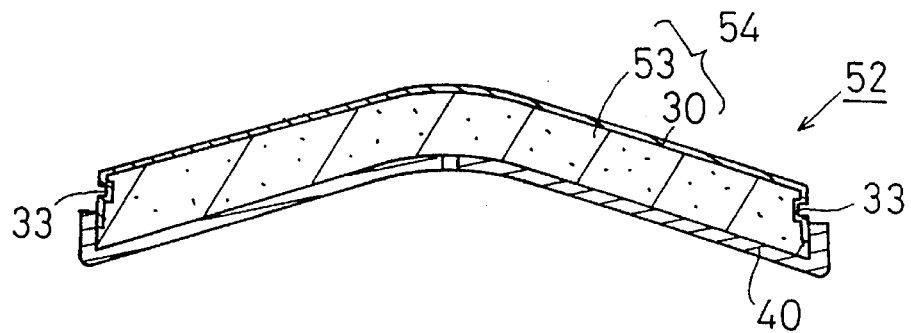
FIG. 4 is a sectional view of a plastic molding obtained by the present invention.

The foaming material P is foamed so that the cavity defined between the skin member 30 and the core 40 is filled with the foaming material P thus foamed. The side portions 32 of the skin member 30 are pressed onto the inner surfaces of the side walls 41 of the core 40 to come into close contact thereby to seal the core 40 and the skin member 30, by the foamed foaming material P and the foaming pressure (gas) generated and increased by foaming (continuing reaction) of the foaming material P, as shown in FIG. 3. Consequently, no leakage or discharge of the foaming material P onto the outer surface of the plastic molding to be formed through the peripheral edge of the skin member 30 occurs. Thus, a plastic molding (product) having the core made integral with the skin by the foam P is obtained. Thereafter, the upper and lower dies 21 and 11 are opened to remove the plastic molding from the die assembly 10. FIG. 4 shows an example of a plastic molding (product) 52 thus obtained. The plastic molding (product) 52 includes the core 40 and the foam/skin assembly 54 consisting of the foam 53 coated with the skin 30. Note that the engaging recesses 33 are located on the side surfaces of the plastic molding (product) 52, and accordingly are inconspicuous.

Figure 8:
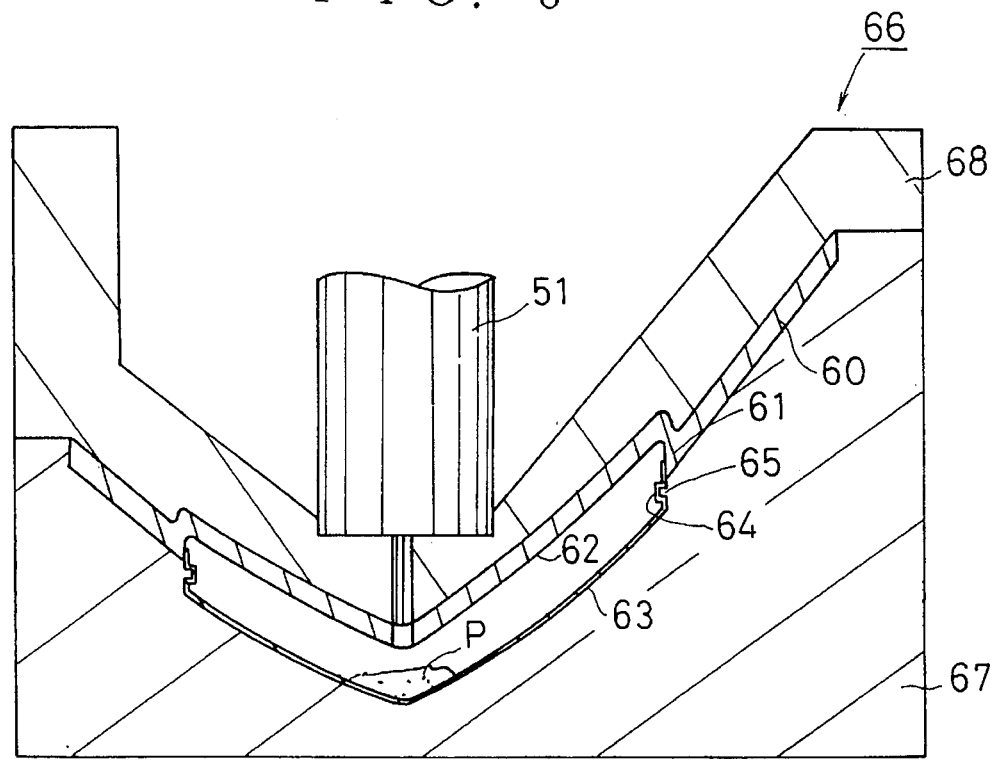
FIG. 8 is a sectional view of a molding die assembly shown in a molding position, according to another aspect of the present invention.

FIG. 8 shows another embodiment of the present invention.

The embodiment shown in FIG. 8 is applied to a method and die apparatus for producing a plastic molding in which the foam with a skin is partly provided on the core. Namely, in the second embodiment illustrated in FIG. 8, the foaming material receiving portion 62 defined by the side walls 61 is partly provided in the core 60. Other structure of the second embodiment is substantially the same as the first embodiment illustrated in FIGS. 1 through 3, as discussed above. In FIG. 8, numeral 63 designates the skin member, 64 the engaging recess, 65 the engaging projection, 66 the die assembly, 67 the lower die, and 68 the upper die, respectively.

Figure 9:
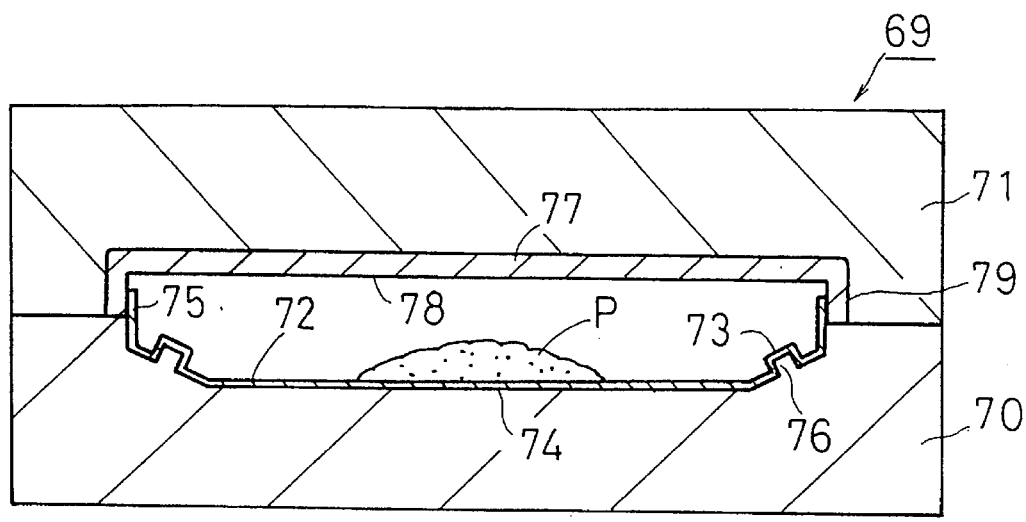
FIG. 9 is a sectional view of another embodiment of a molding die assembly.

A third embodiment shown in FIG. 9 is applied to an open-pouring type in which the lower die 70 and the upper die 71 are opened when the foaming material P is introduced in the die assembly 69 and are thereafter closed when the introduction of the foaming material is completed. Moreover, in FIG. 9, the engaging recesses 73 of the skin member 72 are provided on the edge of the surface portion 74 of the skin member 72 in the vicinity of the side walls 75 thereof. Other structure of the third embodiment illustrated in FIG. 9 is substantially the same as the first embodiment shown in FIGS. 1 through 3. In FIG. 9, numeral 76 designates the engaging projection, 77 the core, 78 the foaming material receiving portion, and 79 the side walls of the core, respectively.

Figure 10:
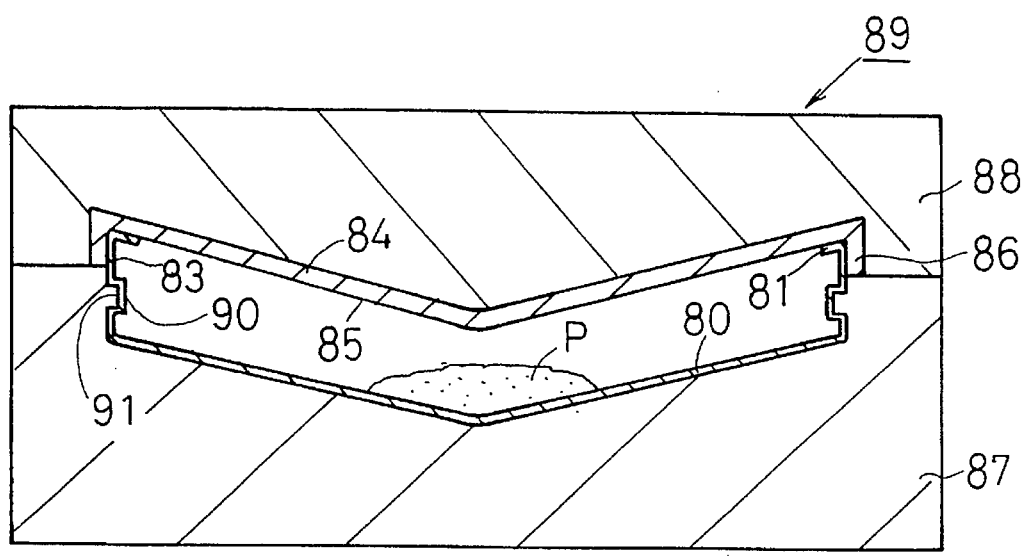
FIG. 10 is a sectional view of still another embodiment of a molding die assembly.

In an embodiment shown in FIG. 10, the ends of the skin member 80 are bent inward into a generally U-shape in cross section to form the side walls 83 having flanges 81 projecting inward from the ends thereof. The flanges 81 enhances the self-shape maintaining property of the side walls 83 to prevent the latter from falling or being inclined. In addition, the flanges 81 also contribute to an establishment of an additional seal between the core 84 and the skin member 80, since the flanges are pressed against the inner surface of the core 84 due to the foaming pressure. In FIG. 10, numeral 85 designates the foaming material receiving portion of the core, 86 the side walls, 87 the lower die, 88 the upper die, 89 the die assembly, 90 the engaging recess, and 91 the engaging projection, respectively.

Figure 11:
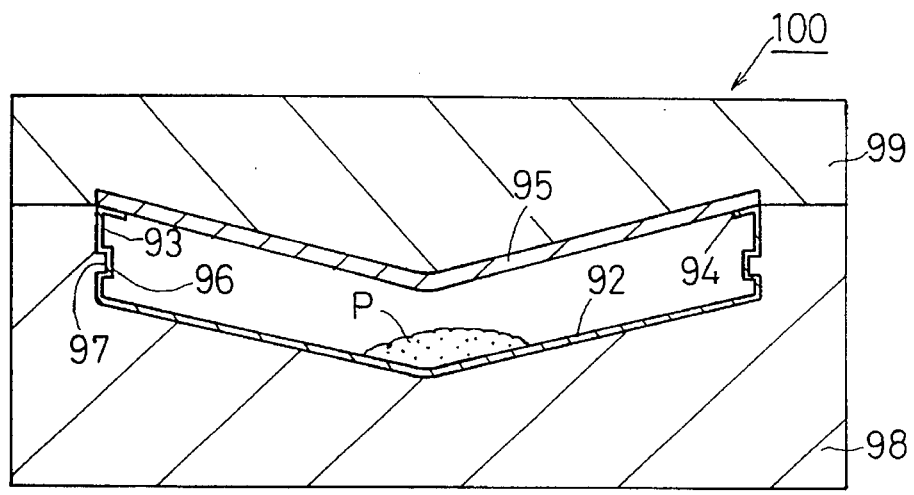
FIG. 11 is a sectional view of yet another embodiment of a molding die assembly.
Figure 12:
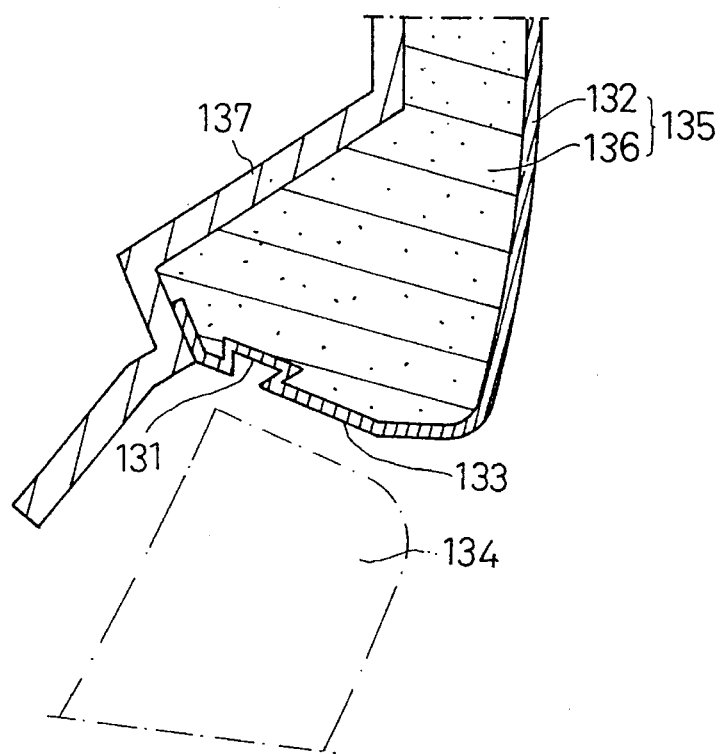
FIG. 12 is a partial sectional view of another example of a plastic molding produced by the present invention.
Figure 13:
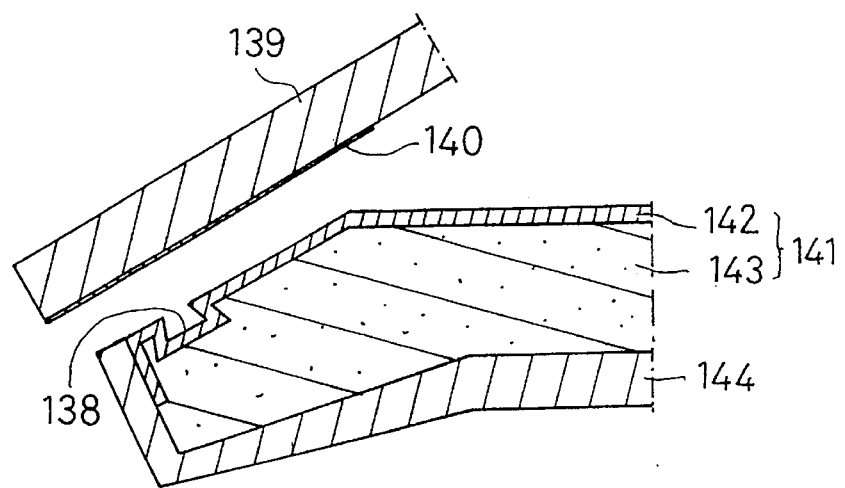
FIG. 13 is a partial sectional view of still another example of a plastic molding produced by the present invention; and, FIG. 14 is a sectional view of a molding die assembly according to the prior art.
Figure 14:
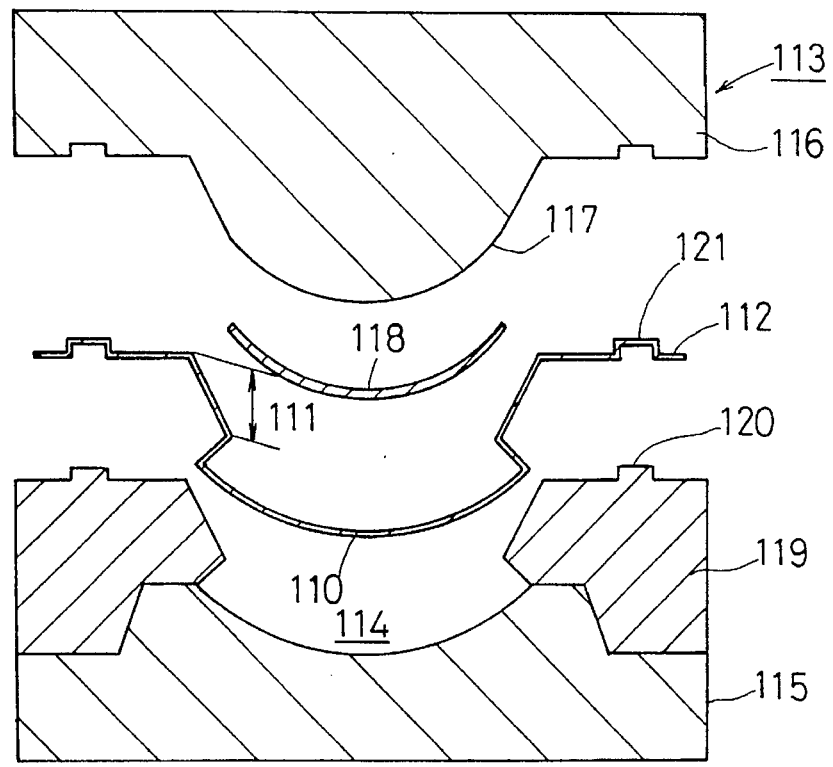

In an embodiment shown in FIG. 11, the ends of the skin member 92 are bent inward into a generally U-shape to form the side walls 93 having flanges 92 projecting inward from the ends thereof, similarly to FIG. 10. The core 95 has no side wall unlike the embodiment shown in FIG. 10. The shape and size of the core 95 are such that the flanges 94 of the skin member 92 come into contact with the opposed ends of the core 95. In the embodiment shown in FIG. 11, the flanges 94 are pressed against the opposed ends of the core 95 due to the foaming pressure of the foaming material P poured in the cavity between the core and the skin member to seal the core and the skin member. In FIG. 11, numeral 96 designates the engaging projection, 97 the engaging recess, 98 the lower die, 99 the upper die, and 100 the die assembly, respectively.

As can be seen in FIG. 3, it is possible to provide gas discharging holes 101 (only one of which is shown) on the portions of the core in the vicinity of the side portions of the skin member 30, so that an excess gas can be discharged through the gas discharging holes 101. Consequently, the foam contains no void due to air bubbles. Furthermore, since the pressure in the vicinity of the gas discharging holes 101 are reduced, the foaming material P can easily expand toward the side portions of the skin member in the vicinity of the gas discharging holes 101, so that the side walls of the skin member 30 can be more certainly pressed onto the side walls of the core 40 by the expanded foam P. In case where the skin member is provided with the flanges 81 or 94, as shown in FIG. 10 or 11, the gas discharging holes 101 extend through the flanges 81 or 94.

As can be understood from the above discussion, according to the present invention, there is no waste of the material of which the skin member is made, and no trimming operation is necessary after the foaming is completed. Moreover, since the edge of the skin member is brought into press contact with the core by the increased foaming pressure to establish a seal therebetween, no precise dimensional adjustment of the seal portion of the die assembly is necessary. Such an adjustment must be effected in the prior art in which the skirt of the skin member is held between the upper and lower dies. In addition to the foregoing, even if there is a failure to correctly connect the upper and lower dies when the latter are closed, a reliable seal can be established. Hence, a high quality product (plastic molding) can be obtained.

I claim:

1. A method for producing a plastic molding having a core and a foam with a skin on an outer surface of the core wherein a foaming material is foamed in a space defined between a skin member and the core, disposed within a molding die assembly having an upper die and a lower die, comprising the steps of:

disposing the skin member, provided with edge portions that are bent backward from an outer surface of the skin member to define side portions and engaging recesses provided on the side portion, on the lower die of the molding die assembly, provided with engaging projections corresponding to the engaging recesses of the skin member, so that the engaging projections of the lower die are fitted in the corresponding engaging recesses of the skin member to position and hold the skin member;

disposing the core, provided with side walls to fit about the skin member, so that at least part of the outer surface of the side portions of the skin member are in contact with at least part of the side walls of the core; and, pouring and foaming the foaming material in a cavity defined by and between the core and the skin member, so that the side portions of the skin member are pressed against the side walls of the core by foaming pressure generated by foaming of the foaming material so as to seal the connection between the core and the skin member and to produce the plastic molding.

2. A producing method according to claim 1, wherein said core is disposed on the die surface of the upper die of the molding die assembly.

3. A producing method according to claim 1, wherein the edge portions of the skin member are bent backward into a generally U-shape in cross section to define side portions having flanges projecting inward therefrom.

4. A method for producing a plastic molding having a core, a skin member, and a foaming material foamed in a space defined between the skin member and the core, produced within a molding die assembly having an upper die and a lower die, comprising the steps of:

disposing the skin member, provided with edge portions that are bent backward from an outer surface of the skin member, so that the skin member has a generally U-shaped cross section with projecting flanges and engaging recesses provided on the flanges, on the lower die of the molding die assembly that is provided with engaging projections corresponding to the engaging recesses of the flanges of the skin member, so that the engaging projections of the lower die are fitted in the corresponding engaging recesses to position and hold the skin member;

disposing the core within the die assembly, so that an interior surface of the core is brought into contact with an exterior surface of the flanges; and, pouring and foaming the foaming material in a cavity defined by and between the core and the skin member, so that flanges of the skin member are pressed against the core by a foaming pressure generated by foaming of the foaming material so as to seal the connection between the core and the skin member and to produce the plastic molding.

5. A producing method according to claim 4, wherein said core is disposed on the die surface of the upper die of the molding die assembly.

* * * * *